United States Patent [19]

Patel et al.

[11] Patent Number: 5,495,040
[45] Date of Patent: Feb. 27, 1996

[54] LOW VOC (VOLATILE ORGANIC COMPOUND) PRIMER FOR JOINING ACRYLONITRILE-BUTADIENE-STYRENE TERPOLYMER ARTICLES

[75] Inventors: Naresh D. Patel, Northridge; Mark W. Brown, Downey, both of Calif.

[73] Assignee: IPS Corporation, Gardena, Calif.

[21] Appl. No.: 309,242

[22] Filed: Sep. 19, 1994

Related U.S. Application Data

[60] Division of Ser. No. 131,998, Oct. 4, 1993, Pat. No. 5,376,717, which is a continuation-in-part of Ser. No. 837,810, Feb. 18, 1992, Pat. No. 5,252,634.

[51] Int. Cl.$^6$ .......................... C07C 69/40; C07C 69/42; C07C 69/44
[52] U.S. Cl. ...................... 560/190; 252/182.28; 252/364
[58] Field of Search .............................. 252/182.28, 364; 560/190

[56] References Cited

U.S. PATENT DOCUMENTS

| | | | |
|---|---|---|---|
| 3,406,136 | 10/1968 | Scarso et al. | 260/23.7 |
| 3,468,834 | 9/1969 | Oda et al. | 260/32.8 |
| 3,984,499 | 10/1976 | Wardlow, Jr. et al. | 260/880 |
| 4,197,355 | 4/1980 | Shepherd | 428/520 |
| 4,244,852 | 1/1981 | Prem et al. | 260/31.8 |
| 4,351,756 | 9/1982 | Prem et al. | 524/314 |
| 4,365,079 | 12/1982 | Hsu et al. | 560/190 |
| 4,602,051 | 7/1986 | Nabeta et al. | 523/137 |
| 4,604,413 | 8/1986 | Nabeta et al. | 523/137 |
| 4,675,354 | 6/1987 | Sperling | 524/99 |
| 4,687,798 | 8/1987 | King, Sr. | 524/100 |

FOREIGN PATENT DOCUMENTS

| | | | |
|---|---|---|---|
| 0183112 | 6/1986 | European Pat. Off. | C08K 5/11 |
| 1090932 | 11/1967 | United Kingdom | C08F 19/02 |

OTHER PUBLICATIONS

Du Pont Product Bulletin re Dibasic Esters.

*Primary Examiner*—Peter Szekely
*Attorney, Agent, or Firm*—Benman Collins & Sawyer

[57] ABSTRACT

An ABS adhesive for joining ABS articles, such as pipes, comprises: (a) about 10 to 35 wt% ABS resin; and (b) about 40 to 60 wt % dibasic esters and, optionally, at least one solvent selected from the group consisting of 0 to about 30 wt % methyl ethyl ketone and 0 to about 10 wt % acetone. The VOC level of the ABS adhesive composition of the invention is at or below the allowed maximum value of 350 g/l. The lap shear strength ranges from about 400 to 700 psi, which is deemed adequate for most non-pressure applications, such as drain, waste, and vent uses, and pool and spa applications.

1 Claim, No Drawings

5,495,040

LOW VOC (VOLATILE ORGANIC COMPOUND) PRIMER FOR JOINING ACRYLONITRILE-BUTADIENE-STYRENE TERPOLYMER ARTICLES

CROSS-REFERENCE TO RELATED APPLICATION

This is a division of application Ser. No. 8/131,998, filed Oct. 4, 1993, U.S. Pat. No. 5,326,717 which in turn is a continuation-in-part of application Ser. No. 07/837,810, filed Feb. 18, 1992, now U.S. Pat. No. 5,252,634, issued Oct. 12, 1993.

BACKGROUND OF THE INVENTION

1. Field of the Invention

The present invention relates generally to adhesives, used for joining ABS (acrylonitrile-butadiene-styrene) molded and extruded items. Specifically, the ABS adhesives disclosed and claimed herein are solvent-based, having an environmentally-acceptable VOC (volatile organic compounds) content.

2. The State-of-the-Art

Solvent-based adhesives have been in use for joining thermoplastic pipe for over 30 years. The development of these adhesives is largely responsible for growth of the thermoplastic pipe industry. Several billion pounds of plastic pipe are produced each year in North America. Rapid-setting, solvent-based adhesives weld the pipes together in a timely manner. These rapid-setting adhesives allow for the testing and trouble-shooting of piping systems in a matter of hours while maintaining the long-term durability of the pipe itself. These characteristics, rapid set, ease of use, long-term durability along with low-cost, have made the joining of plastic pipe by solvent-based adhesives a practical and economic system.

The solvent-based adhesives work primarily by two means of action. First, the solvent portion of the formulation softens the outer surfaces of the pipe through solvation of the plastic. Subsequently, the adhesive joint 'cures' (hardens) by means of the solvents evaporating to the surrounding atmosphere from the pipe. Secondly, the resin dissolved in the adhesive dries through solvent evaporation and provides continuity between the welded pipe surfaces which aid in preserving the integrity of the entire pipe system.

These adhesives cure rapidly (within a matter of hours), often allowing piping systems to be tested the same day as constructed. However, perhaps the most important benefit of these solvent-based adhesives is the maintenance of the integrity of the pipe itself. The resin is the same as the plastic pipe. This provides a high degree of long-term durability for the piping system, often up to 30 to 40 years of useful life. This is essential for these systems which are built into the structures of homes and buildings, or are buried underground.

Thousands of miles of thermoplastic piping systems are constructed each day throughout the world, primarily by the means previously described. These systems are predominately used in non- or low-pressure systems, such as drain, waste, and vent (DWV) applications in home and industry, gas conduit, sewer applications, etc.

Evaporation of solvents from adhesives is a concern to an environmentally-concerned world, along with all other potential sources of air pollution. Typical solids (non-volatile) contents of plastic pipe adhesives are 15 to 30 wt % of ABS resin, or compound. The balance of the formulation is methyl ethyl ketone (MEK) solvent, as specified by ASTM D-2235. By definition, MEK is considered to be a VOC. That is, MEK is a volatile compound which contains the element carbon excluding methane, carbon monoxide, carbon dioxide, carbonic acid, metallic carbides and carbonates, ammonium carbonate, and exempt compounds, such as methylene chloride and 1,1,1-trichloroethane. Typical VOC values of present commercial ABS solvent adhesives range from 650 to 750 grams/liter.

Regulations are being created throughout North America regarding allowable VOC levels in adhesive formulations. Federal, state, and local agencies are beginning to adopt strict measures to drastically reduce these levels. The south Coast Air Quality Management District (SCAQMD) in the Los Angeles area has been a leader of the establishment of rules governing VOCs, such as SCAQMD Rule 1168.

SCAQMD Rule 1168 specifies a VOC level for ABS adhesives of 350 g/l or less, as determined by Method 316-A. All ABS adhesives used after Jan. 1, 1994, are required to meet that maximum allowed level.

Thus, an ABS adhesive for joining ABS molded and extruded items, such as pipes, having a maximum VOC level of 350 g/l is required.

SUMMARY OF THE INVENTION

In accordance with the invention, an ABS adhesive for joining ABS molded and extruded items, such as ABS pipes, is provided. The ABS adhesive comprises:

(a) about 10 to 35 wt % ABS resin; and (b) about 40 to 90 wt % dibasic esters and, optionally, at least one solvent selected from the group consisting of 0 to about 30 wt % methyl ethyl ketone and 0 to about 10 wt % acetone, with the proviso that the maximum of methyl ethyl ketone and/or acetone does not exceed about 30 wt %.

The VOC level of the ABS adhesive composition of the invention is at or below the allowed maximum value of 350 g/l. The lap shear strength of the ABS adhesive, which is in the range of about 400 to 700 psi, is considered to be adequate for non-pressure applications, such as drain, waste, and vent (DWV) applications and pools and spas using ABS molded and/or extruded items.

Further in accordance with the present invention, a welding primer for ABS comprises DBE, either alone or with either of the solvents listed above in the indicated ranges. The welding primer is used to prime the ABS part, prior to application of the ABS adhesive.

DETAILED DESCRIPTION OF THE PREFERRED EMBODIMENT

The major portion of solvent emission from solvent-based adhesives for joining thermoplastic articles occurs during application of the adhesive to the article. The sources of these emissions are the welding primer used to prepare the surface of the article, open containers filled with adhesive, as well as the bead applied to the article and fittings themselves, including spillage of adhesive onto the ground during application. Once the article and fittings are welded together, the contribution from the adhesive in the joint is minimal. The majority of the solvent remaining in the adhesive bead is absorbed into the substrates.

Current adhesives and primers used in joining ABS articles incorporate MEK, which is a highly volatile solvent, as the sole solvent and majority portion of ABS adhesive formulations. It is noted that in joining ABS pipe together, a primer is not ordinarily used.

MEK is highly volatile with a vapor pressure at 20° C. of 70 mm Hg. Accordingly, typical ABS formulations have VOC composite partial pressures of about 70 mm Hg at 20° C.

Acetone, which is also a true solvent for ABS, could be used as the major or sole solvent of an adhesive formulation. However, this solvent has a rather high vapor pressure (about 185 mm Hg at 20° C.), which limits its use in low VOC applications.

The inventors have found that yet another true solvent for ABS comprises certain mixtures known as dibasic esters (DBE). These dibasic esters comprise refined dimethyl esters of adipic, glutaric, and succinic acids and are available from Du Pont Chemicals (Wilmington, Del.). They are characterized by an extremely low vapor pressure (<0.3 Torr at 20° C.) and very low VOC emissions. Adhesives may be compounded using DBE as the major or sole solvent of a formulation while substantially reducing the composite vapor pressure.

In accordance with the invention, adhesives for sealing ABS articles are formulated by employing DBE as the sole or major solvent ingredient. Additional ingredients optionally include MEK and acetone.

Such adhesive formulations easily meet the environmental VOC requirements of less than 350 g/l, but would not be acceptable under present ASTM D-2235. On the other hand, the lap shear strength is in the range of 400 to 700 psi, and this is considered adequate for non-pressure applications, such as DWV and pool and spa applications.

Specifically, the adhesive of the invention comprises:

(a) about 10 to 35 wt % ABS resin; and (b) about 40 to 90 wt % dibasic esters and, optionally, at least one solvent selected from the group consisting of 0 to about 30 wt % methyl ethyl ketone and 0 to about 10wt % acetone, with the proviso that the maximum of methyl ethyl ketone and/or acetone does not exceed about 30 wt %.

The adhesive formulations of the invention lower the VOC composite partial pressure to <0.3 mm Hg at 20° C. for adhesive compositions containing only DBE as the solvent. Where the solvent includes MEK and/or acetone, the VOC composite vapor pressure is higher, but in any event is not greater than that of present adhesives which employ only MEK as the solvent.

As indicated above, the ABS resin concentration ranges from about 10 to 35 wt % of the total adhesive. At least 10 wt % is required to fill any gaps between the joints of the ABS articles being joined together. Greater than about 35 wt % is not soluble in the solvent system and tends to form a 'gel'.

Any of the ABS resins commonly employed in ABS adhesives may be used in the practice of the invention. However, for ABS pipe applications, the ABS compound employed should advantageously conform to the specifications set forth in ASTM D-3965 and ASTM D-2235.

The solvent system employed in the ABS adhesive of the invention may be characterized as comprising solely DBE or DBE with at least one of MEK and acetone.

Dibasic esters (DBE) are solvents that improve stability of the adhesive in the container and reduce VOC emissions of the adhesive.

DBE ranges from about 40 to 90wt %. At concentrations greater than about 90 wt %, there is insufficient ABS resin to fill any gaps between the joints of the ABS articles being joined together.

MEK ranges from 0 to about 30 wt %. This solvent is a true solvent for the ABS resin system. Greater than about 30 wt % of MEK tends to increase the VOC level to unacceptable values. The high vapor pressure of MEK of 70 mm Hg is thus offset by limiting the maximum concentration of this solvent to 30 wt % or less and providing at least about 10 wt % ABS resin in conjunction with at least 40 wt % DBE.

Acetone ranges from 0 to about 10 wt %. This solvent is a true solvent for the ABS resin system. Greater than about 10 wt % of acetone tends to increase the VOC level to unacceptable values. The high vapor pressure of acetone of 185 mm Hg is thus offset by limiting the maximum concentration of this solvent to 10 wt % or less and providing at least about 10 wt % ABS resin in conjunction with at least 40 wt % DBE.

The ABS adhesive of the invention may include additional solids. Such additional solids that may be present include fillers, thixotropic agents, pigments, stabilizers, and the like. Up to about 10 wt % of the adhesive may contain such additional solids. Thus, the total solids content (resin plus the additional solids) in the adhesive of the invention ranges from about 10 to 45 wt %. Any of the solids (fillers, thixotropic agents, pigments, stabilizers, etc.) commonly used in ABS adhesives may be employed in the practice of the present invention.

Preferred fillers include low specific gravity hollow ceramic spheres and calcium carbonate. The amount of filler ranges up to about 7 wt % of the adhesive composition.

Preferred pigments include carbon black dispersion and other colors commonly used in the industry. The amount of pigment ranges up to about 2 wt % of the adhesive formulation.

The thixotropic agents, such as fumed silica and precipitated silica (e.g., Cab-o-Sil, Aerosil, and Hi-Sil) and treated bentonite clay (e.g., Bentone 27) may be used at low levels to obtain optimum flow properties, especially with regard to controlling spillage from the pipe upon application. The amount of thixotropic agent ranges up to 5 wt % of the adhesive composition.

The low vapor pressure solvents, particularly DBE, help accomplish the monumental task of formulating adhesives which volatilize at a substantially reduced rate. These solvents significantly lower the emissions derived from adhesives used in the plastic pipe industry. Thixotropic agents formulated into these adhesives make a tangible contribution to lowering the emissions through controlling spillage. These changes to current formulations are minimal to the end user from the standpoint of application, testing, economics, and long-term durability and liability.

The adhesive formulations of the invention lower the VOC level to 350 g/l or less, and evidence an adequate lap shear strength of about 400 to 700 psi, which is considered adequate for non-pressure applications in joining ABS molded and extruded articles, such as ABS pipe.

Most of the adhesives of the invention have a composite vapor pressure of less than about 2 mm Hg, which is considerably lower than that of presently-available ABS adhesives, which, due to the sole use of MEK, have a composite vapor pressure of about 70 mm Hg.

Use of certain DBEs results in an adhesive that is considered by some regulatory groups to be exempt from VOC regulations. This is because the adhesive has a composite vapor pressure of less than 0.1 mm Hg at 20° C. Such adhesives may be considered to be non-VOC. These adhesives are formulated by using only dibasic ester as the solvent and employing specific dibasic esters selected from DBE, DBE-2, DBE-3, DBE-5, and DBE-6.

In this connection, the following DBE formulations are commercially available at the time of filing this patent application (taken from a Du Pont product sheet):

| Composition, wt % | DBE | DBE-2 | DBE-3 | DBE-4 | DBE-5 | DBE-6 | DBE-9 |
|---|---|---|---|---|---|---|---|
| dimethyl adipate | 15 | 24 | 89 | — | 0.1 | 98.7 | 0.2 |
| dimethyl glutarate | 60 | 75 | 10 | 0.3 | 99 | <0.5 | 66 |
| dimethyl succinate | 24 | 0.3 | 0.05 | 98.4 | 0.4 | <0.1 | 33 |

Small amounts of methanol and water are also present. As an aside, DBE, as generally used herein, refers to dibasic esters. However, it will be noted that a specific composition is also denoted DBE. It will be readily apparent to the person skilled in the art when the generic term is employed and when the specific composition is being referred to herein.

The use of DBE as the sole or primary solvent provides an ABS adhesive having a high flash point and low volatility. This means that the user is not exposed to fumes from the adhesive (as in MEK-based adhesives) and that the adhesive is relatively non-flammable. The adhesive of the present invention is thus relatively odor-free. Non-flammability allows shipping of the adhesive without requiring following onerous regulations dealing with flammable adhesives.

A further advantage provided by the use of DBE as the sole or primary solvent is that the working time is longer than with MEK. This means that joints do not set as quickly, providing time for the user to line up ABS articles, such as pipe, before setting.

The adhesives of the invention are advantageously made in a batch process. The solvent or solvents are charged one at a time to the mixing tank and blended for a short period of time to achieve a state of equilibrium. The resin is then charged to the mixer and mixed with high shear dispensers to achieve complete dissolution in the solvent system. At this point, the pigments and fillers (if needed) are added and dispersed to ensure substantially uniform dispersion. The thixotropic agent (if needed) is added last and dispersed to achieve the desired flow characteristics.

The adhesives of the invention are useful in joining ABS pipe in all ABS applications, including, but not limited to, non- or low-pressure systems, such as drain, waste and vent (DWV) applications, gas conduit, sewer applications, and pool and spa applications. The joint is readily made and quickly placed into service. The adhesives of the invention are applied to the ABS joints in the same way as other commercial ABS adhesives.

No primer is needed. Consequently, the adhesive of the invention may be considered to be a one-step cement, in contrast to prior art formulations, which require a primer and hence are two-step cements. Without subscribing to any particular theory, it appears that the higher level of low vapor pressure solvent etches the pipe and/or fitting in the same manner that the primer does.

The adhesives of the invention maintain the shelf stability associated with presently used ABS adhesives and exhibit desirably lower VOC levels. Specifically, the adhesives meet VOC regulations such as those published by South Coast Air Quality Management District Rule 1168 and Ventura county (Calif.), and are expected to meet the eventual regulations of San Diego (Calif.) Air Quality Management District and other regulatory agencies, when published.

The discovery that DBEs are true solvents for ABS permits their use as welding primers for ABS articles. While primers are not ordinarily employed in conjunction with ABS pipe, they may find use in joining other ABS articles together. Such a primer comprises either 100 wt % DBE or includes either of the solvents listed above in the indicated amounts. Specifically, the primer comprises DBE and, optionally, at least one solvent selected from the group consisting of 0 to about 30 wt % MEK and 0 to about 10 wt % acetone, with the proviso that the maximum of methyl ethyl ketone and/or acetone does not exceed about 30 wt %.

If at least one optional solvent is employed, then at least about 3 wt % of such optional solvent is used.

EXAMPLES

Example 1

Table I below lists an example of an adhesive composition of the invention and its properties, including the viscosity of the adhesive (as measured by a Brookfield viscometer) and the composite vapor pressure in mm of Hg. The ABS resin used was GE Blendex 211, available from GE Company; the dibasic ester was DBE, available from Du Pont Company. The results of the following tests are also shown in Table I: lap shear strength, VOC level, hydrostatic sustained pressure, and hydrostatic burst strength.

The compressive strength (in psi) was measured after a cure time of 48 hours at room temperature. For comparison, the minimum ASTM required average value per ASTM D-2235 is 800 psi. Further, the VOC level (in g/l) was measured, using Method 316-A, as provided in Rule 1168 of SCAQMD. For comparison, the maximum VOC level permitted is 350 g/l.

The hydrostatic sustained pressure was conducted at 73° F. (22.8° C.) on joining 2 inch ABS pipe in accordance with generally accepted industry practice following a 24 hour cure. For meeting the minimum requirement in accordance with generally accepted industry practice, the assembly was maintained in water at 73° F. for 24 hours at 50 psi. A pass/fail indication suffices to indicate whether the test is met.

The hydrostatic burst strength (in psi) was measured at room temperature (73° F., or 22.8° C.) on joining 2 inch ABS pipe after 24 hours curing. A minimum value of 400 psi is considered acceptable for non-pressure applications.

TABLE I

| Composition and Viscosity of Adhesives. | |
|---|---|
| Components | Example 1 |
| ABS - 211 | 25.0 |
| DBE | 75.0 |
| Total | 100 |
| Viscosity, cp | 2240 |
| Composite vapor pressure, mm Hg | 0.2 |
| Lap shear strength, psi | 740 |
| Hydrostatic sustained pressure | pass |
| Hydrostatic burst strength, psi: | 300 |
| VOC level, g/l | 119 |

The above composition of the invention evidenced low VOC levels and acceptable strength for non-pressure applications.

Examples 2–16

Several formulations of ABS resin with different formulations of dibasic esters (DBE, DBE-2, DBE-3) were prepared and measured. The results are shown in Table II below.

TABLE II

DBE-Based ABS Compositions.

| Components | Example: 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| ABS - 211 | 35.0 | 30.0 | 25.0 | 20.0 | 15.0 | 35.0 | 30.0 | 25.0 | 20.0 | 15.0 | 35.0 | 30.0 | 25.0 | 20.0 | 15.0 |
| DBE Solvent: | | | | | | | | | | | | | | | |
| DBE-2 | 65.0 | 70.0 | 75.0 | 80.0 | 85.0 | | | | | | | | | | |
| DBE | | | | | | 65.0 | 70.0 | 75.0 | 80.0 | 85.0 | | | | | |
| DBE-3 | | | | | | | | | | | 65.0 | 70.0 | 75.0 | 80.0 | 85.0 |
| Viscosity, cp | 29000 | 7900 | 2280 | 600 | 180 | 29000 | 8300 | 2240 | 620 | 180 | 36000 | 9600 | 2540 | 640 | 200 |
| Lap shear strength, psi (avg) | — | 365 | 430 | 347 | 512 | — | 487 | 740 | 775 | 747 | — | 499 | 501 | 435 | 455 |
| Composite vapor pressure, mm Hg | 0.1 | 0.1 | 0.1 | 0.1 | 0.1 | 0.2 | 0.2 | 0.2 | 0.2 | 0.2 | 0.06 | 0.06 | 0.06 | 0.06 | 0.06 |
| VOC level, g/l | | | | | | | | 119 | 161 | | | | | | |

Note:
Example 11 is the same as Example 1 above;
Example 12 is the same an Example 17 below.

Table II shows that different dibasic ester compositions may be employed in the practice of the present invention. The VOC levels were measured for two of the compositions (Examples 11 and 12), but not for the other compositions. The VOC level for these other compositions is expected to be considerably less than 350 g/l, based on the low vapor pressure of these dibasic esters of 0.2 mm Hg and lower. This Table also shows that the compressive shear strength is primarily in the range of about 400 to 700 psi, which is considered acceptable for most non-pressure applications.

Examples 17–22

Compositions were prepared in which methyl ethyl ketone was used as the solvent, with and without DBE. These compositions and their properties are set forth in Table III, below. Lap shear was measured after 48 hours, per ASTM D-2235.

TABLE III

Formulations Containing MEK and/or DBE.

| Components | Example 17 | 18 | 19 | 20 | 21 | 22 |
|---|---|---|---|---|---|---|
| MEK | — | 10.0 | 20.0 | 30.0 | 40.0 | 80.0 |
| DBE | 80.0 | 70.0 | 60.0 | 40.0 | 40.0 | — |
| ABS - 211 | 20.0 | 20.0 | 20.0 | 30.0 | 20.0 | 20.0 |
| Viscosity, cp | 620 | 350 | 230 | 1100 | 115 | 50 |
| VOC level, g/l | 161 | 239 | 319 | 334 | 433 | 470 |
| Lap shear, psi | 722 | 881 | 1026 | 1114 | 1190 | 1594 |

As is evident from Table III, at an MEK concentration of between 30 and 40 wt %, the VOC level is unacceptable. ABS resin may be added to reduce VOC level, as shown for Example 20. The addition of at least 10 wt % MEK results in an adhesive composition that meets the strength requirement of ASTM D-2235.

Thus, there has been disclosed an ABS adhesive for bonding ABS articles to ABS articles. It will be readily apparent to those skilled in this art that various changes and modifications of an obvious nature may be made, and all such changes and modifications are considered to fall within the scope of the invention, as defined by the appended claims.

What is claimed is:

1. A primer for joining acrylonitrile-butadiene-styrene terpolymer (ABS) articles, comprising:

(a) about 70 to 97 wt % dibasic esters comprising a mixture of refined dimethyl esters of adipic, glutaric, and succinic acids; and (b) the balance at least one solvent selected from the group consisting of methyl ethyl ketone and acetone, with the proviso that acetone does not exceed about 10 wt % in said primer.

* * * * *